United States Patent [19]
Huang et al.

[11] Patent Number: 5,978,558
[45] Date of Patent: Nov. 2, 1999

[54] COLOR FAX/VIDEO PRINTING MEANS FOR DIGITAL STILL CAMERA (DSC)

[76] Inventors: Ing-Kai Huang, 8F, No. 51, Liuh-Shui Rd.; Lin Shih-Chuan, No. 98, Lane 2, Kao-Feng Rd.; Wen-Shien Hsu, No. 17, Alley 38, Lane 173, Ke Shyue Yuan Rd., all of Hsin Chu, Taiwan

[21] Appl. No.: 08/915,796

[22] Filed: Aug. 21, 1997

[51] Int. Cl.[6] ............................ G06T 15/00; G05B 11/00
[52] U.S. Cl. ............................ 395/114; 395/114; 358/442
[58] Field of Search ..................................... 395/113, 114, 395/101, 111, 109, 105, 112; 358/498, 472, 474, 442, 475, 476, 468

[56] References Cited

U.S. PATENT DOCUMENTS 5,684,602  11/1997  Tsuchiya ................................. 358/404
5,740,505  4/1998  Kusumoto et al. ...................... 399/200
5,790,279  8/1998  Sakellaropoulos ....................... 358/498
5,812,901  9/1998  Morikawa ................................. 399/19
5,815,764  9/1998  Tomory ..................................... 399/1
5,835,577  11/1998  Disanto et al. ....................... 379/93.19

Primary Examiner—Scott Rogers
Assistant Examiner—Douglas Q. Tran
Attorney, Agent, or Firm—Rosenberg, Klein & Bilker

[57] ABSTRACT

A Color fax/video printing means for a digital still camera (DSC) which integrate the structure and function of fax, video signal, copying, printing and data communication apparatus in a whole and adopts method and structure such as computer architecture, central processing unit, data communication, DSC, ink-jet printing or laser printing, embedded circuit, firmware, dual bus, ASIC, programmable, cell active and pin sharing etc. to achieve advantages of enhancing efficiency, simplifying structure and operation, reducing cost and power consumption.

8 Claims, 1 Drawing Sheet

COLOR FAX/VIDEO PRINTING MEANS FOR DIGITAL STILL CAMERA (DSC)

BACKGROUND OF THE INVENTION

The present invention relates generally to a color fax/video printing means for a DSC, which utilizes methods and structures such as computer architecture, central processing unit, data communication, DSC, ink-jet printing or laser printing, embedded circuit, firmware, dual bus, ASIC, programmable, cell active and pin sharing etc. to achieve advantages of enhancing efficiency, simplifying structure and operation, reducing cost and power consumption.

The demand for fax, DSC, copier and printer becomes more urgent as the SOHO (small office and home office) becomes more popular recently. However, the provision of above units is bulky and expensive. Moreover, the above apparatus lack of the ability of single-unit operation and data sharing. Therefore, a compact and light weight set which can integrate the functions of above apparatus will be of great convenience.

The object of the present invention is to provide a color fax/video printing means for a DSC to achieve advantages of enhancing efficiency, simplifying structure and operation, reducing cost and power consumption.

BRIEF DESCRIPTION OF THE DRAWING

The object, structure, features and advantage of the present invention can be best understood by explaining a preferred embodiment thereof in junction with accompany drawing wherein.

BRIEF DESCRIPTION OF NUMERAL

Figure 1:
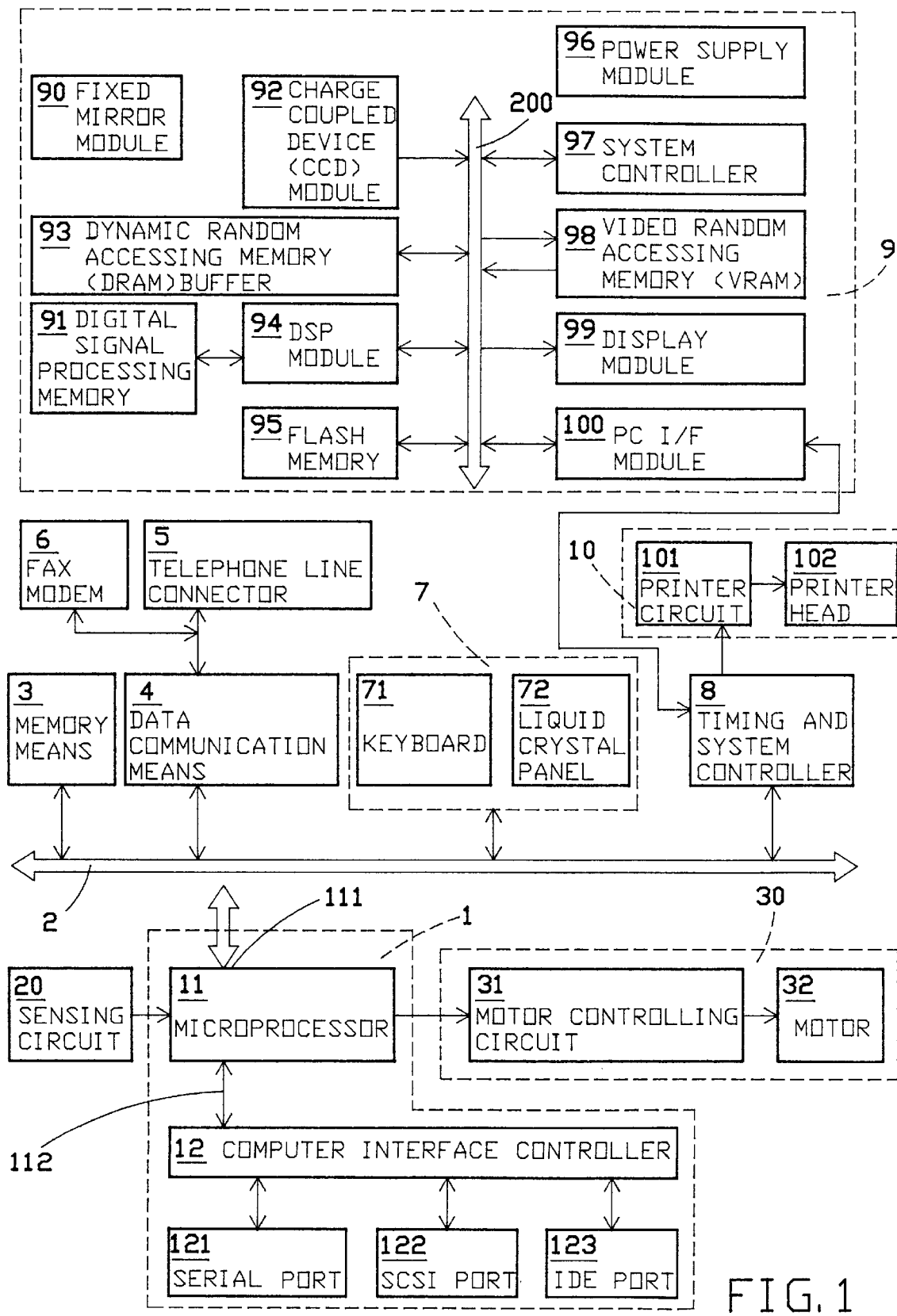
FIG. 1 is the block diagram of the present invention.

| | | | |
|---|---|---|---|
| 1 | CPU | 121 | serial port |
| 11 | microprocessor | 122 | SCSI port |
| 111 | peripheral bus control | 123 | IDE port |
| 112 | internal bus | 5 | telephone line connector |
| 12 | computer interface controller | 6 | fax modem |
| 2 | peripheral bus | 7 | panel interface |
| 3 | memory means | 71 | keyboard |
| 4 | data communication means | 72 | liquid crystal panel |
| 8 | timing and system controller | 200 | internal bus port |
| 9 | DSC | 102 | printer head |
| 90 | fixed mirror module | | |
| 91 | digital signal processing memory | | |
| 92 | charge coupled device (CCD) module | | |
| 93 | dynamic random accessing memory (DRAM) buffer | | |
| 94 | DSP module | | |
| 95 | flash memory | | |
| 96 | power supply module | | |
| 97 | system controller | | |
| 98 | video random accessing memory (VRAM) | | |
| 99 | display module | | |
| 100 | PC I/F module | | |
| 10 | print means | | |
| 101 | printer circuit | | |
| 20 | sensing circuit | | |
| 30 | paper feeder | | |
| 31 | motor controlling circuit | | |
| 32 | motor | | |

DETAILED DESCRIPTION OF THE INVENTION

As shown in FIG. 1, the color fax/video printing means for a DSC according to the present invention comprises: a CPU 1, a peripheral bus 2, a memory means 3, a data communication means 4, a telephone line connector 5, a fax modem 6, a panel interface 7, a timing and system controller 8, a DSC 9, a printing means 10, a sensing circuit 20 and a paper feeder 30.

The CPU 1 is connected to the peripheral bus 2 through the peripheral bus control 111 and the peripheral bus 2 is connected to the input/output bus of the memory means 3, the data communication means 4, the panel interface 7, and the timing and system controller 8. The input of CPU 1 is connected to the output of the sensing circuit 20 and its output is connected to the input of paper feeder 30.

The CPU 1 utilizes the structure and technology of embedded circuit and comprises mainly a microprocessor 11, a computer interface controller 12 and a internal bus 112, wherein the microprocessor 11 is connected to the computer interface controller 12 through the internal bus 112.

The CPU 1 is functioned mainly for program execution, bus control, system control, paper-feeding control, data processing and communication. The tasks of data processing and communication include the compression and decompression of data and interface protocol conversion.

As to the interface standard of the data communication according to the present invention, the transmission for black-and-white document adopts the G3 interface protocol recommended by the CCITT (Consultative Committee for International Telephony and Telegraphy). The transmission of color document adopts the scheme based on the ITU T.30.annex E defined by CCITT in junction with the data compression and decompression technology of JPEG (Journal Professional Engineer Group).

The program executed by the CPU 1 is recorded in microprocessor 11 in the form of firmware or recorded in a programmable read only memory (PROM) which is embedded into the CPU 1.

The memory means 3 provides the program the required memory for storage of program and data.

The data communication means 4 is connected to a telephone line connector 41 and is functioned and structured as data pump. The conventional designs utilize data pump and fax data chip, whereas the present invention uses the microprocessor 11 to realize the function of the fax data chip for the sake of reducing cost and simplifying circuit.

The panel interface 7 provides the function of user interface and consists mainly a keyboard 71 and a liquid crystal panel 72. The user can input his command through the keyboard 71 and acquire the operation status from the liquid crystal panel 72.

The timing and system controller 8 integrate the function of quartz oscillator, logic circuit and input/output control into a high integration chip by the structure and technology of ASIC, pin sharing and cell active. The timing and system controller 8 utilizes the structure and technology of pin sharing and cell active to minimize the pin number and circuit board optimally, and save manufacture cost. The input/output function is switched by the CPU 1.

The dual bus adopted by the present invention consists of the peripheral bus 2 and the internal bus 112. The microprocessor 11 can control the peripheral bus 2 through a peripheral bus control 111, and control the internal bus 112 which is connected to the computer interface controller 12. The present invention adopts dual bus scheme to save CPU time and enhance transmission efficiency.

The computer interface controller 12 and data communication means 4 provide the function of data communication.

The input/output ports of the computer interface controller 12 are serial port 121, SCSI port 122, IDE port 123, and internal bus 112, wherein the serial port 121, the SCSI port 122, and the IDE port 123 utilize the structure and technology of programmable, pin sharing and cell active. The default setting of the present invention are the serial port 121 and the SCSI port 122. In case of requiring the IDE port 123, the setting can be changed to the serial port 121 and the IDE port 123 by inputting command through the keyboard 71. After receiving the command, the microprocessor 11 can redefine the pin assignment of the SCSI 122 to that of the IDE port 123. The adoption of programmable, pin sharing and cell active can simplify the circuit layout and save the cost.

The paper feeding control of fax according to the present invention adopts feedback control. The sensing circuit 20 can detect the registration signal of the paper to be printed and send the sensed result to the microprocessor 11. After data processing, the microprocessor 11 can send a control signal to the motor control circuit 31 to drive the motor 32 for feeding paper.

The structure and function of video, copying and printing according to the present invention are realized by the timing and system controller 8, the DSC 9, and the printing means 10. The DSC 9 consists of a fixed mirror module 90, a digital signal processing memory 91, a charge coupled device (CCD) module 92, a dynamic random accessing memory (DRAM) buffer 93, a DSP module 94, a flash memory 95, a power supply module 96, a system controller 97, a video random accessing memory (VRAM) 98, a display module 99, a PC I/F module 100 and a internal bus port 200. The output port of the PC I/F module 100 of the DSC 9 is connected to the input port of the timing and system controller 8 to receive the video signal output from the DSC 9.

The printing means comprises a printing circuit 101 and a printing head 102. The printing head 102 can be black or color ink-jet head. The copied and printed document will be black-and-white document for the adoption of black ink-jet head. The copied and printed document will be color document for the adoption of color ink-jet head. The printing head 102 can be other type of head such as thermal-recording or dot-matrix in case of other embodiments.

During its operation, the DSC 9 sends the video signal to the timing and system controller 8 which will send the video signal to the CPU 1 through the peripheral bus 2. The video signal is processed by the CPU 1 and then sent to the memory means 3. The memory means 3 send the data to CPU 1 through the peripheral bus 2 according to the command of the CPU 1. The CPU 1 can output the data through the serial port 121, the SCSI port 122 and the IDE port 123.

During the fax transmission operation, the DSC 9 sends the video signal to the timing and system controller 8 which will send the video signal to the CPU 1 through the peripheral bus 2. The video signal is processed by the CPU 1 and then sent to the memory means 3. The video signal is then sent to the data communication means 4 and output to public network.

During the fax reception operation, the remote fax signal is transmitted from public network to the telephone line connector 5 and fax modem 6 provided by the data communication means 4. The fax modem 6 send the digital data to CPU 1 through the peripheral bus 2. The digital data is processed by CPU 1 and then stored in the memory means 3. Afterward, the digital data is sent, through peripheral bus 2, to the timing and system controller 8 which will print the data through printing means 10.

During the copying operation, the DSC 9 sends the video signal to the timing and system controller 8 which will send the video signal to the CPU 1 through peripheral bus 2. After processed by the CPU 1, the signal is sent, through peripheral bus 2, to the timing and system controller 8 which will print the data through printing means 10.

During the printing operation, the signal is input to CPU 1 through the serial port 121, the SCSI port 122 and the IDE port 123. After processed by the CPU 1, the signal is sent, through peripheral bus 2, to the timing and system controller 8 which will print the data through printing means 10.

As previously described, by utilizing the present invention, the structure and function of fax, video signal, copying, printing and data communication apparatus can be integrated as a whole. The present invention can be utilized in industrial application advantageously and meets the patentable requirement.

While the present invention has been described in connection with what is presently considered to be the most practical and preferred embodiments, it would be apparent to those skilled in the art that various modification and variations can be made without departing from the spirit and scope of the present invention. For examples, the constitutional part of DSC can be changed in response to different operation type. Thus, it is intended that the present invention cover the modification and variations of this invention provided they come within the scope of appended claims and their equivalent.

What is claimed is:

1. A color fax/video printing means for a digital still camera (DSC), said DSC having a video output port connected to said fax/printing means to provide video signal thereto, said fax/printing means including:

a CPU provided for program execution, bus control, system control, paper-feeding control, data processing and communication, said CPU employing embedded technology and including a microprocessor including peripheral bus control means, a computer interface controller, an internal bus and firmware;

a peripheral bus connected to the peripheral bus control means of said CPU;

memory means connected to said peripheral bus to provide storage of a program and data required by the program;

data communication means connected to said peripheral bus and a telephone line network;

a fax modem connected to said data communication means and said telephone line network, and provided with a data port for data communication;

a timing and system controller connected between the video output port of said DSC and said CPU through said peripheral bus, respectively, and offering timing and controlling functions for realization of video communication, fax, copying, and printing;

printing means connected to an output port of said timing and system controller for printing the data from said timing and system controller; and a paper feeder, connected to an output port of said CPU, said paper feeder including a motor controlling circuit and a motor for controlling paper feeding.

2. A color fax/video printing means for a DSC as in claim 1, wherein said printing means is provided with a printing circuit and a printing head which is connected to the output port thereof for printing the data from said timing and system controller.

3. A color fax/video printing means for a DSC as in claim 1, wherein said peripheral bus is connected to a penal interface which has a keyboard and a liquid crystal panel for user interface.

4. A color fax/video printing means for a DSC as in claim 1, wherein the program executed by said CPU is recorded in said microprocessor in the form of firmware or recorded in a programmable read only memory (PROM) which is embedded into said CPU.

5. A color fax/video printing means for a DSC as in claim 1, wherein the input/output ports of said computer interface controller of said CPU are connected to a serial port, a SCSI port, and an IDE to communicate with outside computer, these three port having pin sharing and the pin assignment and operation manner of said SCSI port and said IDE port being selected by way of programmable and cell active.

6. A color fax/video printing means for a DSC as in claim 1, wherein said timing and system controller integrates the function of quartz oscillator, logic circuit and input/output control into a high integration chip by the structure and technology of ASIC, pin sharing and cell active and the pin number thereof can be minimized optimally by the technology of pin sharing and cell active.

7. The color fax/video printing means for a digital still camera of claim 1, further including a sensing circuit coupled to an input port of said microprocessor embedded in said CPU, said sensing circuit detecting a registration signal of a paper to be printed and supplying a detected event to said microprocessor, said microprocessor sending a control signal to said motor controlling circuit to drive said motor for paper feeding in response to said detected event.

8. A fax/video/printing apparatus for a digital still camera, said apparatus having a fax transmission mode of operation, a fax reception mode of operation, a copying mode of operation, and a printing mode of operation, said apparatus comprising:

a CPU having embedded therein a microprocessor, a computer interface, an internal bus and firmware;

a peripheral bus coupled to said CPU;

memory means coupled to said peripheral bus;

a timing and system controller connected between said digital still camera and said CPU through said peripheral bus, and data communication means connected to said peripheral bus;

during said fax transmission mode of operation, said digital still camera sending video signals to said timing and system controller, said timing and system controller sending respective signals corresponding to said video signals to said CPU through said peripheral bus for processing, said processed data being transferred to said memory means through said peripheral bus, said CPU subsequently calling said processed data from said memory means and sends processed data to said data communications means;

during said fax reception mode of operation, a fax signal is received through said data communication means and is supplied to said CPU through said peripheral bus, data corresponding to said fax signal being processed by said CPU and being stored in said memory means, said CPU subsequently calling said stored data from said memory means and sending said data to said timing and system controller for being printed out;

in said copying mode of operation, said digital still camera sending video signals to said timing and system controller, said timing and system controller sending respective signals corresponding to said video signals to said CPU through said peripheral bus for processing and returning processed signals to said timing and system controller through said peripheral bus to be printed out; and in said printing mode of operation, a signal is input to said CPU, and after being processed, the signal is sent to said timing and system controller to be printed out.

* * * * *